(12) United States Patent
Strein (10) Patent No.: US 12,279,003 B2
(45) Date of Patent: Apr. 15, 2025

(54) CLOUD AND HYBRID-CLOUD PRODUCTION MANAGEMENT SYSTEM

(71) Applicant: Disney Enterprises, Inc., Burbank, CA (US)

(72) Inventor: Michael J. Strein, Bohemia, NY (US)

(73) Assignee: Disney Enterprises, Inc., Burbank, CA (US)

( * ) Notice: Subject to any disclaimer, the term of this patent is extended or adjusted under 35 U.S.C. 154(b) by 84 days.

(21) Appl. No.: 17/990,548

(22) Filed: Nov. 18, 2022

(65) Prior Publication Data

US 2024/0171793 A1   May 23, 2024

(51) Int. Cl.
*H04N 21/2543* (2011.01)
*H04N 21/24* (2011.01)
*H04N 21/647* (2011.01)

(52) U.S. Cl.
CPC ..... *H04N 21/2543* (2013.01); *H04N 21/2405* (2013.01); *H04N 21/64769* (2013.01)

(58) Field of Classification Search
None
See application file for complete search history.

(56) References Cited

U.S. PATENT DOCUMENTS 11,212,258 B2   12/2021   Strein et al.
2023/0032748 A1*   2/2023   Sodhi .................. H04L 41/16

FOREIGN PATENT DOCUMENTS

CA   3104458 A1 *   12/2019   ............. G06F 16/45

OTHER PUBLICATIONS

"Amazon Nimble Studio: Accelerate Content Creation in the Cloud" Amazon Web Services Sep. 12, 2022 12 pgs.
"AWS Portal: Licensing" AWS Thinkbox Oct. 3, 2022 12 Pgs.

* cited by examiner

*Primary Examiner* — Omar S Parra
(74) *Attorney, Agent, or Firm* — Farjami & Farjami LLP (57) ABSTRACT

A system includes a processor, and a memory storing software code and a machine learning (ML) model trained to allocate media production resources. The processor executes the software code to receive data describing a media flow requiring processing, identify, using the data and the ML model, media production resources for processing the described media flow, obtain the media production resources, and aggregate, from each of the media production resources, performance and billing metrics of a respective one of the media production resources resulting from processing of the described media flow by the media production resources. The processor may further execute the software code to determine, using the aggregated performance and billing metrics, a resource allocation efficiency score corresponding to each of one or more of the media production resources to provide one or more resource allocation efficiency score(s), and further train, using the resource allocation efficiency score(s), the ML model.

20 Claims, 4 Drawing Sheets

CLOUD AND HYBRID-CLOUD PRODUCTION MANAGEMENT SYSTEM

BACKGROUND

Media production facilities typically rely on local software defined networks (SDNs) to efficiently move media flows and coordinate media production. In traditional media production environments, these SDNs for managing media flows are implemented using "on-premises" resources for which the production facility has control of the information technology (IT) architecture. In addition, the actual work of media production is often performed using on-premises hardware resources and on-premises human expertise.

However, as highly scalable cloud-based virtual resources become increasingly available and affordable, and as automation solutions become increasingly proficient in replicating the performance of human contributors to media production, the transition to cloud-based and hybrid cloud/on-premises (hereinafter "cloud and hybrid-cloud") media production grows more attractive. However, in the present cloud-based resource environment, production resources are typically provided a la carte by a variety of different vendors, so that a media production facility must normally obtain computing and storage resources under a contract with a particular vendor, arrange for media flow transfer bandwidth from another vendor, license media production software applications from yet other vendors, and so forth. Consequently, there is a need in the art for systems providing consolidated cloud and hybrid-cloud production management.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing cloud and hybrid-cloud production management. Historically, media production companies have increased efficiency in their productions by outsourcing functions to managed services companies. These companies typically replicate the same workflows with similar resources, but often move them to a less expensive environment (e.g., another state or country), and then create a "one stop shop" for the media production company. Using methods outlined in the present application and by taking advantage of the state-of-the-art in cloud services and applications, a new model is available for these managed services options.

As stated above, in the present cloud-based resource environment, production resources are typically provided a la carte by a variety of different vendors, so that a media production facility must normally obtain computing and storage resources under a contract with a particular vendor, arrange for media flow transfer bandwidth from another vendor, license media production software applications from yet other vendors, and so forth. This logistical complexity undesirably deters many potential users of cloud and hybrid-cloud production resources from enjoying the scalability, reduced hardware costs, and reduced human resources costs those resources enable.

The cloud and hybrid-cloud production management solution disclosed in the present application advances the state-of-the-art by creating a metering environment that provisions and tracks substantially all of the resources used in media production. That is to say, the present cloud and hybrid-cloud production management solution includes software code that, when executed by a processor, accesses all required production resources, such as licensing applications, flow management applications, bandwidth utilization applications, and cloud-based computing and storage resources via respective Application Programming Interfaces (APIs) that interpret and track those metrics. It is noted that systems and methods for performing hybrid-cloud media production resource management are disclosed by U.S. Pat. No. 11,212,258, issued on Dec. 28, 2021, and titled "Extensible Resource Management for Hybrid Cloud-Based Media Production," which is hereby incorporated fully by reference into the present application.

Furthermore, the present cloud and hybrid-cloud production management solution utilizes a machine learning (ML) model trained to optimize the allocation of media production resources. The complexity of the assessments of cloud and hybrid-cloud media production resource cost and availability required by the present production management solution makes human performance of those assessments impracticable or impossible, even with the assistance of the processing and memory resources of a general purpose computer. Thus, the novel and inventive systems and methods disclosed in the present application further advance the state-of-the-art by introducing an artificial intelligence (AI) inspired automated ML model-based approach to allocating media production resources.

As used in the present application, the terms "automation," "automated," and "automating" refer to systems and processes that do not require the participation of a human system operator. Although, in some implementations, a system operator or administrator may review or even adjust the performance of the automated systems and according to the automated methods described herein, that human involvement is optional. Thus, the methods described in the present application may be performed under the control of hardware processing components of the disclosed automated systems.

It is also noted that, as defined in the present application, the expression "machine learning model" may refer to a mathematical model for making future predictions based on patterns learned from samples of data or "training data." For example, machine learning models may be trained to perform image processing, natural language understanding (NLU), and other inferential data processing tasks. Various learning algorithms can be used to map correlations between input data and output data. These correlations form the mathematical model that can be used to make future predictions on new input data. Such a predictive model may include one or more logistic regression models, Bayesian models, or artificial neural networks (NNs). A "deep neural network," in the context of deep learning, may refer to a NN that utilizes multiple hidden layers between input and output layers, which may allow for learning based on features not explicitly defined in raw data. As used in the present application, a feature identified as a NN refers to a deep neural network.

Moreover, it is noted that the types of content included in the media flows managed using the present cloud and hybrid-cloud production management systems and methods include audio-video (AV) content having both audio and video components, video unaccompanied by audio, and audio unaccompanied by video. In addition, or alternatively, in some implementations, the type of content included in the media flows managed using the present cloud and hybrid-cloud production management systems and methods may be or include digital representations of persons, fictional characters, locations, objects, and identifiers such as brands and logos, for example, which populate a virtual reality (VR), augmented reality (AR), or mixed reality (MR) environment. Moreover, that content may depict virtual worlds that can be experienced by any number of users synchronously and persistently, while providing continuity of data such as personal identity, user history, entitlements, possessions, payments, and the like. It is noted that the present cloud and hybrid-cloud production management systems and methods disclosed by the present application may also be applied to media flows including content that is a hybrid of traditional audio-video and fully immersive VR/AR/MR experiences, such as interactive video.

Figure 1:
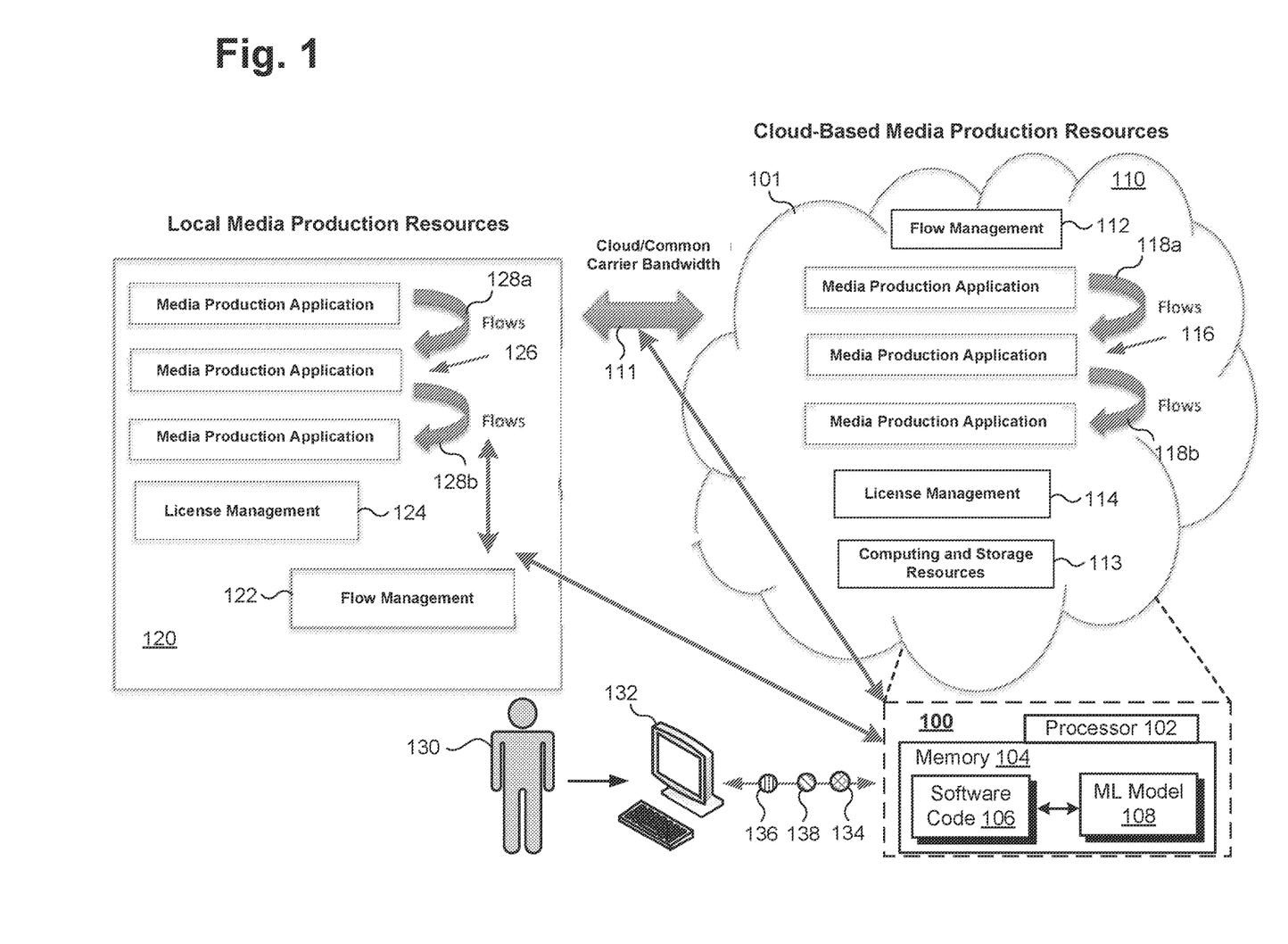
FIG. 1 shows an exemplary cloud and hybrid-cloud production management system, according to one implementation.

FIG. 1 shows exemplary system 100 for providing cloud and hybrid-cloud production management, according to one implementation. As shown in FIG. 1, system 100 includes processor 102 and memory 104 implemented as a computer-readable non-transitory storage medium. According to the present exemplary implementation, memory 104 stores software code 106 and ML model 108 trained to optimize allocation of media production resources.

As further shown in FIG. 1, system 100 is implemented within a use environment including cloud-based communication network 101 (hereinafter "cloud 101") including cloud-based media production resources 110, and in some use cases may also include local "on-premises" media production resources 120 (hereinafter "local media production resources 120"). It is noted that, in some implementations, system 100 may provide exclusively cloud-based production management, in which use cases the use environment in which system 100 is implemented may omit local media production resources 120. However, in other implementations system 100 provides hybrid-cloud production management, in which use cases the environment in which system 100 is implemented may include both local media production resources 120 and cloud-based media production resources 110.

Cloud-based media production resources 110 include resources configured to receive and process media flows 118a and 118b in cloud 101. As shown in FIG. 1, cloud-based media production resources 110 include cloud bandwidth, common carrier bandwidth, or both (hereinafter "cloud/common carrier bandwidth 111"), flow management 112 services (hereinafter "flow management 112"), computing and storage resources 113, and license management services 114 (hereinafter "license management") for licensing of one or more media production applications 116. It is noted that flow management 112 of media flows 118a and 118b includes coordinating and tracking the names, associations, paths, potential bandwidth usage, etc. of media flows 118a and 118b as they move through the allocated resources of cloud 101. It is further noted that although FIG. 1 depicts two media flows 118a and 118b in cloud 101, that representation is provided merely in the interests of conceptual clarity. In various use cases, the cloud and hybrid-cloud media production processes managed according to the concepts disclosed by the present application may include more than two media flows 118a and 118b in cloud 101.

Local media production resources 120, when included in the use environment of system 100, include resources configured to process media flows 128a and 128b. As shown in FIG. 1, local media production resources 120 include flow management services 122 (hereinafter "flow management 122"), license management services 124 (hereinafter "license management 124") for licensing of one or more media production applications 126, and local hardware computing and storage resources (not shown in FIG. 1). FIG. 1 further shows system user 130 utilizing user system 132 to interact with system 100, data 134 describing a media flow requiring processing, combined bill of services 136 for processing media flows 118a and 118b, media flows 128a and 128b, or media flows 118a, 118b, 128a, and 128b, and report 138. Analogously to flow management of media flows 118a and 118b in cloud 101, flow management 122 of media flows 128a and 128b includes coordinating and tracking the names, associations, paths, resource usage, etc. of media flows 128a and 118b as they move through local media production resources 120. Moreover, although FIG. 1 depicts two media flows 128a and 128b being processed using local media production resources 120 that representation is also provided merely in the interests of conceptual clarity. In various use cases, the hybrid-cloud media production processes managed according to the concepts disclosed by the present application may include more than two media flows 128a and 128b processed using local media production resources 120.

Although the present application refers to software code 106 and ML model 108 as being stored in memory 104 of system 100 for conceptual clarity, more generally, memory 104 may take the form of any computer-readable non-transitory storage medium. The expression "computer-readable non-transitory storage medium," as used in the present application, refers to any medium, excluding a carrier wave or other transitory signal that provides instructions to processor 102 of system 100. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

Moreover, although FIG. 1 depicts software code 106 and ML model 108 as being co-located in memory 104, that representation is also provided merely as an aid to conceptual clarity. More generally, system 100 may include one or more computing platforms, such as computer servers for example, which may be co-located, or may form an interactively linked but distributed system, such as a cloud-based system, for instance. As a result, processor 102 and memory 104 may correspond to distributed processor and memory resources within system 100. Consequently, in some implementations, software code 106 and ML model 108 may be stored remotely from one another on the distributed memory resources of system 100. It is also noted that, in some implementations ML model 108 may take the form of a software module included in software code 106.

Processor 102 may include multiple hardware processing units, such as one or more central processing units, one or more graphics processing units, and one or more tensor processing units, one or more field-programmable gate arrays (FPGAs), custom hardware for machine-learning training or inferencing, and an API server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of system 100, as well as a Control Unit (CU) for retrieving programs, such as software code 106, from memory 104, while a GPU may be implemented to reduce the processing overhead of the CPU by performing computationally intensive graphics or other processing tasks. A TPU is an application-specific integrated circuit (ASIC) configured specifically for AI processes such as machine learning.

In some implementations, system 100 may correspond to one or more web servers accessible over a packet-switched network such as the Internet, for example. Alternatively, system 100 may correspond to one or more computer servers supporting a wide area network (WAN), a local area network (LAN), or included in another type of private or limited distribution network. In addition, or alternatively, in some implementations, system 100 may utilize a local area broadcast method, such as User Datagram Protocol (UDP) or Bluetooth, for instance. Furthermore, in some implementations, system 100 may be implemented virtually, such as in a data center. For example, in some implementations, system 100 may be implemented in software, or as virtual machines. Moreover, in some implementations, system 100 may be communicatively coupled to cloud-based media production resources 110, local media production resources 120, or cloud-based media production resources 110 and local media production resources 120, via a high-speed network suitable for high performance computing (HPC), for example a 10 GigE network or an Infiniband network.

It is further noted that, although user system 132 is shown as a desktop computer in FIG. 1, that representation is provided merely by way of example. In other implementations, user system 132 may take the form of any suitable mobile or stationary computing device or system that implements data processing capabilities sufficient to provide a user interface, support connections to system 100, and implement the functionality ascribed to user system 132 herein. That is to say, in other implementations, user system 132 may take the form of a laptop computer, tablet computer, or smartphone, to name a few examples. Alternatively, in some implementations, user system 132 may be a "dumb terminal" peripheral device of system 100 controlled by processor 102.

In various implementations, media flows 128a and 128b processed in or originating from the local environment including local media production resources 120 are typically multi-cast media flows, while media flows 118a and 118b processed in cloud 101 may be multi-cast media flows or unicast media flows. It is noted that "multicast" is a term used to describe communication in which a piece of information is sent from one or more points to a set of other points. In this case there may be one or more senders, and the information is distributed to a group of receivers. One example of an application which may use multicast is a video server sending out networked television (TV) channels. Concurrent delivery of high quality video to each of a large number of delivery platforms will exhaust the capability of even a high bandwidth network with a powerful video clip server. This poses a major scalability issue for applications which require sustained high bandwidth. One way to significantly ease scaling to larger groups of clients is to employ multicast networking. Multicasting is the networking technique of delivering the same packet concurrently to a group of clients. IP multicast provides dynamic many-to-many connectivity between a set of senders (at least 1) and a group of receivers.

In contrast to multicast, "unicast" is a term used to describe communication in which a piece of information is sent from one point to another point. In this case there is just one sender and one receiver. Unicast transmission, in which a packet is sent from a single source to a specified destination, is a predominant form of transmission on LANs and within the Internet. All LANs, such as Ethernet, for example, as well as IP networks, support the unicast transfer mode. Examples of the standard unicast applications supported by LANs and IP networks include Hypertext Transfer Protocol (HTTP), Simple Mail Transfer Protocol (SMTP), File Transfer Protocol (FTP), and Telnet, each of which employs TCP.

The format of an IP multicast packet is identical to that of unicast packets and is distinguished by the use of a special class of destination address (i.e., class D IPv4 address), which denotes a specific multicast group. Since Transmission Control Protocol (TCP) supports only the unicast mode, multicast applications must typically use the User Datagram Protocol (UDP) transport protocol. Unlike broadcast transmission, which is used on some local area networks (LANs), multicast clients receive a stream of packets only if they have previously elected to do so, for example by joining the specific multicast group address. Membership of a group may be dynamic and may be controlled by the receivers, which are informed by the local client applications. The routers in a multicast network learn which sub-networks have active clients for each multicast group and attempt to minimize the transmission of packets across parts of the network for which there are no active clients. The multicast mode is useful if a group of clients require a common set of data at the same time, or when the clients are able to receive and store common data until needed. Where there is a common need for the same data required by a group of clients, multicast transmission may provide significant bandwidth savings, for example, up to I/N of the bandwidth compared to N separate unicast clients.

However, in cloud-based computing environments, whether they are public or private, multicast flow management has typically been impermissible due in part to the unpredictable demands that multicast signals can place on cloud bandwidth. However, it is contemplated that cloud-based virtual production environments may evolve to accommodate multicast flow management. Consequently, in some implementations media flows 118a and 118b processed in cloud 101 may be multicast media flows. Nevertheless, most present use cases require conversion of multicast media flows into unicast media flows prior to processing in cloud 101 using cloud-based media production resources 110. Thus, and as noted above, in some implementations media flows 128a and 128b processed in or originating from the local environment including local media production resources 120 are typically multi-cast media flows, while media flows 118a and 118b processed in cloud 101 may be unicast media flows.

It is noted that where media flows 118a and 118b originate in the local environment including local media production resources 120 as respective media flows 128a and 128b, the timing protocol applied to media flows 128a and 128b may be incompatible with timing schemes permitted in cloud 101. For example, timing of media flows 128a and 128b may be controlled in the local environment including local media production resources 120 using Precision Time Protocol (PTP), which is known in the art, but which is typically not permitted in cloud-based computing environments. However, it is contemplated that cloud-based virtual production environment 104 may evolve to support use of PTP. Consequently, in some implementations media flows 128a and 128b may have a timing protocol that is impermissible in cloud 101, while in other implementations the timing protocol used for media flows 128a and 128b may be permitted in cloud 101.

Figure 2:
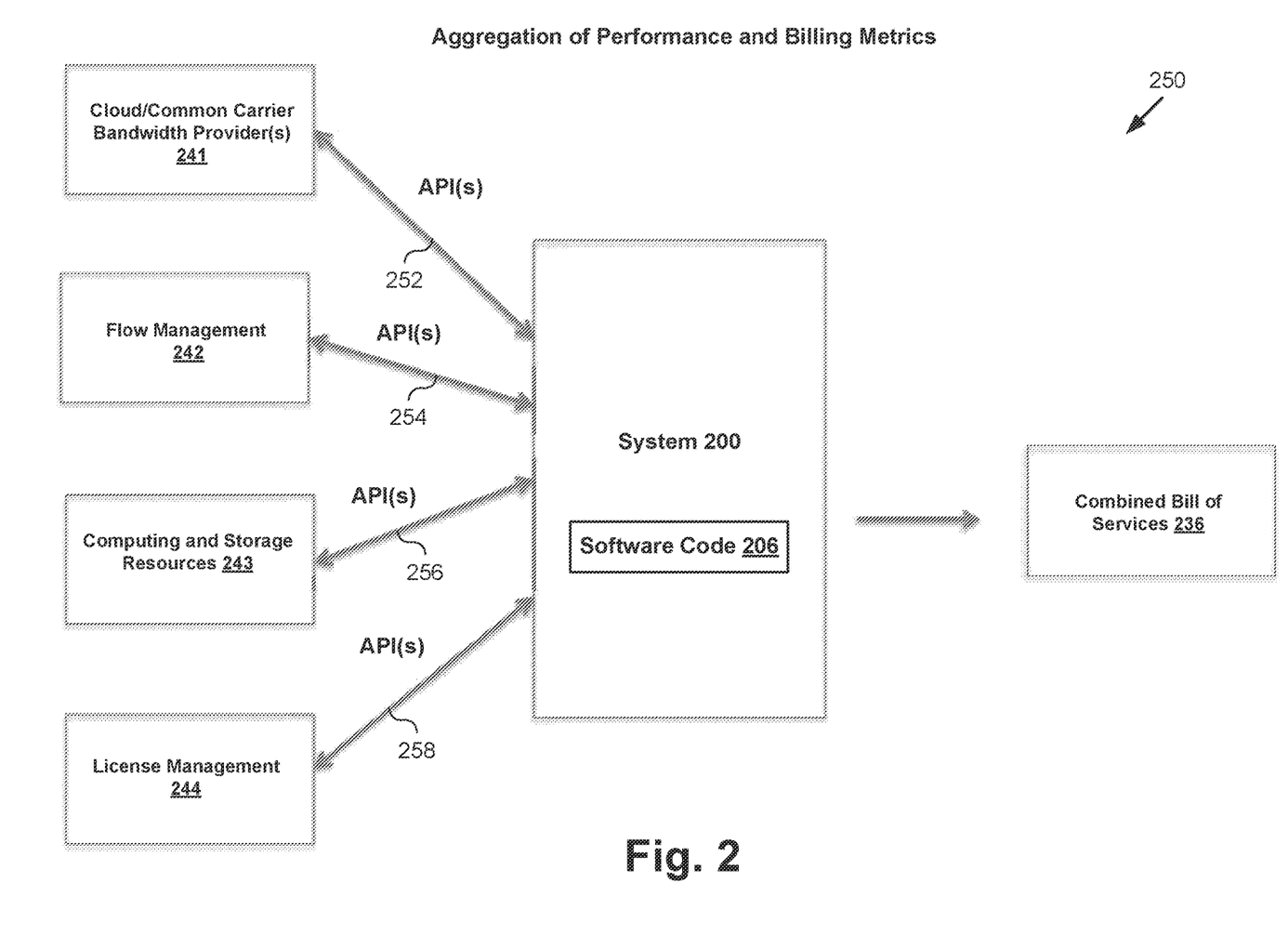
FIG. 2 shows a diagram depicting the aggregation of performance and billing metrics by the system shown in FIG. 1, according to one implementation.

FIG. 2 shows diagram 250 depicting the aggregation of performance and billing metrics by system 200, according to one implementation. As shown in FIG. 2, system 200 including software code 206 may be communicatively coupled to a provider or providers of cloud bandwidth, common carrier bandwidth, or both (hereinafter "cloud/common carrier bandwidth provider(s) 241"), flow management 242, computing and storage resources 243, and license management 244, via respective APIs 252, 254, 256, and 258. Also shown in FIG. 2 is combined bill of services 236 output to a client, such as system user 130 in FIG. 1, by system 200 based on the performance and billing metrics aggregated from cloud/common carrier bandwidth provider(s) 241, flow management 242, computing and storage resources 243, and license management 244.

System 200, software code 206, and combined bill of services 236 correspond respectively in general to system 100, software code 106, and combined bill of services 136, in FIG. 1. Consequently, system 100, software code 106, and combined bill of services 136 may share any of the characteristics attributed to respective system 200, software code 206, and combined bill of services 236 by the present disclosure, and vice versa.

Provider(s) of cloud/common carrier bandwidth 241 are provider(s) of cloud/common carrier bandwidth 111, in FIG. 1. It is noted that provider(s) of cloud/common carrier bandwidth 241 may include a single provider of cloud bandwidth, or multiple separate providers of cloud and common carrier bandwidth. As a result, API 252 may correspond to one or more APIs (hereinafter "API(s) 252") each communicatively coupling system 100/200 to a different bandwidth provider.

Flow management 242 corresponds to either or both of a provider of flow management 112 in cloud 101 or a provider of flow management 122 included among local media production resources 120, in FIG. 1. As a result, API 254 may correspond to one or more APIs (hereinafter "API(s) 254"). That is to say, in implementations in which system 100/200 provides exclusively cloud-based production management, API(s) 254 may correspond to a single API communicatively coupling system 100/200 to flow management 112. However, in implementations in which system 100/200 provides hybrid-cloud production management, API(s) 254 may correspond to multiple APIs each communicatively coupling system 100/200 to a different provider of local or cloud flow management.

Computing and storage resources 243 corresponds to either or both of a provider of computing and storage resources 113 in cloud 101 or a provider of computing and storage resources included among local media production resources 120. As a result, API 256 may correspond to one or more APIs (hereinafter "API(s) 256"). That is to say, in implementations in which system 100/200 provides exclusively cloud-based production management, API(s) 256 may correspond to a single API communicatively coupling system 100/200 to computing and storage resources 113. However, in implementations in which system 100/200 provides hybrid-cloud production management, API(s) 256 may correspond to multiple APIs each communicatively coupling system 100/200 to a different provider of local or cloud computing and storage resources.

License management 244 corresponds to either or both of a provider of license management 114 in cloud 101 or a provider of license management 124 included among local media production resources 120, in FIG. 1. As a result, API 258 may correspond to one or more APIs (hereinafter "API(s) 258"). That is to say, in implementations in which system 100/200 provides exclusively cloud-based production management, API(s) 258 may correspond to a single API communicatively coupling system 100/200 to a provider of license management 114. However, in implementations in which system 100/200 provides hybrid-cloud production management, API(s) 254 may correspond to multiple APIs each communicatively coupling system 100/200 to a different provider of local or cloud license management.

With respect to the performance and billing metrics aggregated from cloud/common carrier bandwidth provider(s) 241, flow management 242, computing and storage resources 243, and license management 244, those metrics may identify the amounts of resources and services provided by cloud/common carrier bandwidth provider(s) 241, flow management 242, computing and storage resources 243, and license management 244, the time duration of use of those resources and services, and the costs of those resources and services. For example, performance and billing metrics obtained from cloud/common carrier bandwidth provider(s) 241 may identify the total amount of bandwidth used to move media flows into cloud 101, out of cloud 101, or into and out of cloud 101, as well as the time duration over which that bandwidth is used and the cost of the used bandwidth during the time of use.

Analogously, performance and billing metrics obtained from flow management 242 may include the number of media flows managed, the time duration of media flow management, and the resulting costs, while performance and billing metrics for computing and storage resources 243 may include the computing and storage resources consumed, the time over which those resources were consumed, and the resulting costs. Also analogously, performance and billing metrics obtained from license management 244 may include the number of licenses obtained, the time duration of those licenses, and the resulting costs.

Figure 3A:
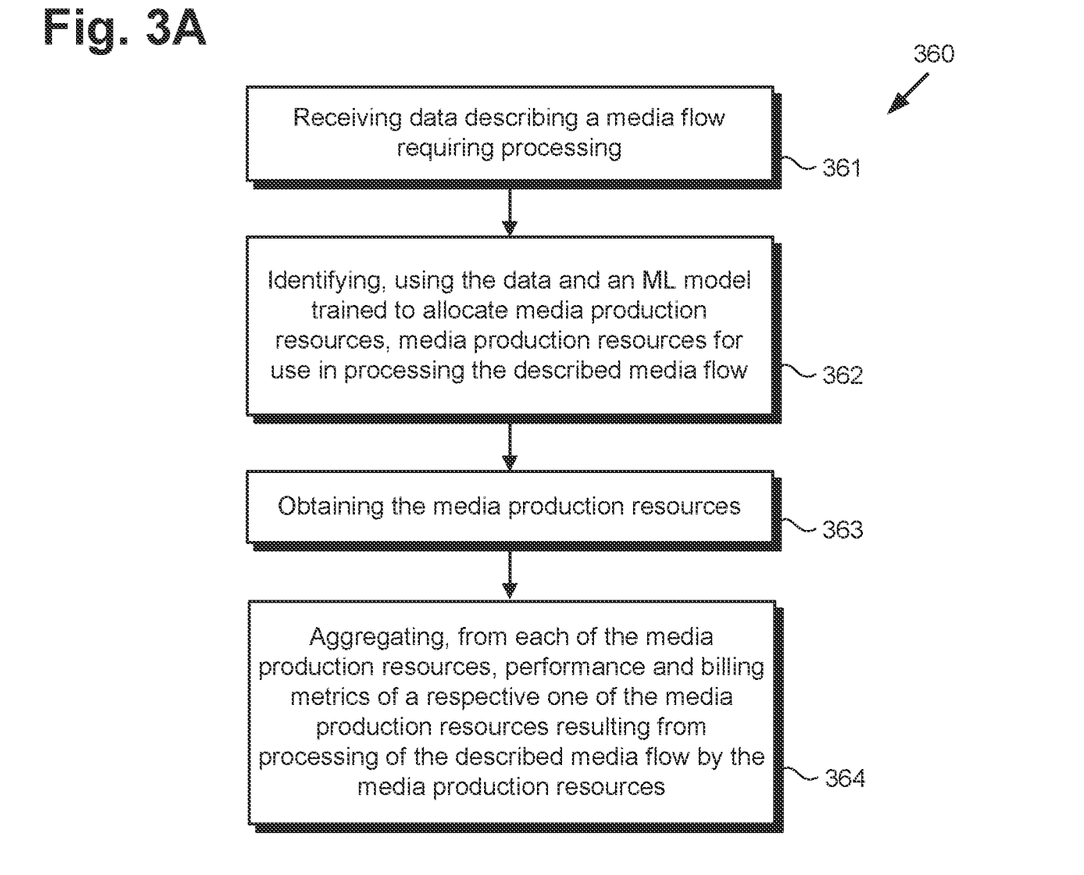
FIG. 3A shows a flowchart presenting an exemplary method for providing cloud and hybrid-cloud production management, according to one implementation.

The functionality of system 100/200 and software code 106/206 will be further described by reference to FIGS. 3A and 3B. FIG. 3A shows flowchart 360 presenting an exemplary method for providing cloud and hybrid-cloud production management, according to one implementation, while FIG. 3B shows additional actions for extending the method presented in FIG. 3A, according to various implementations.

Figure 3B:
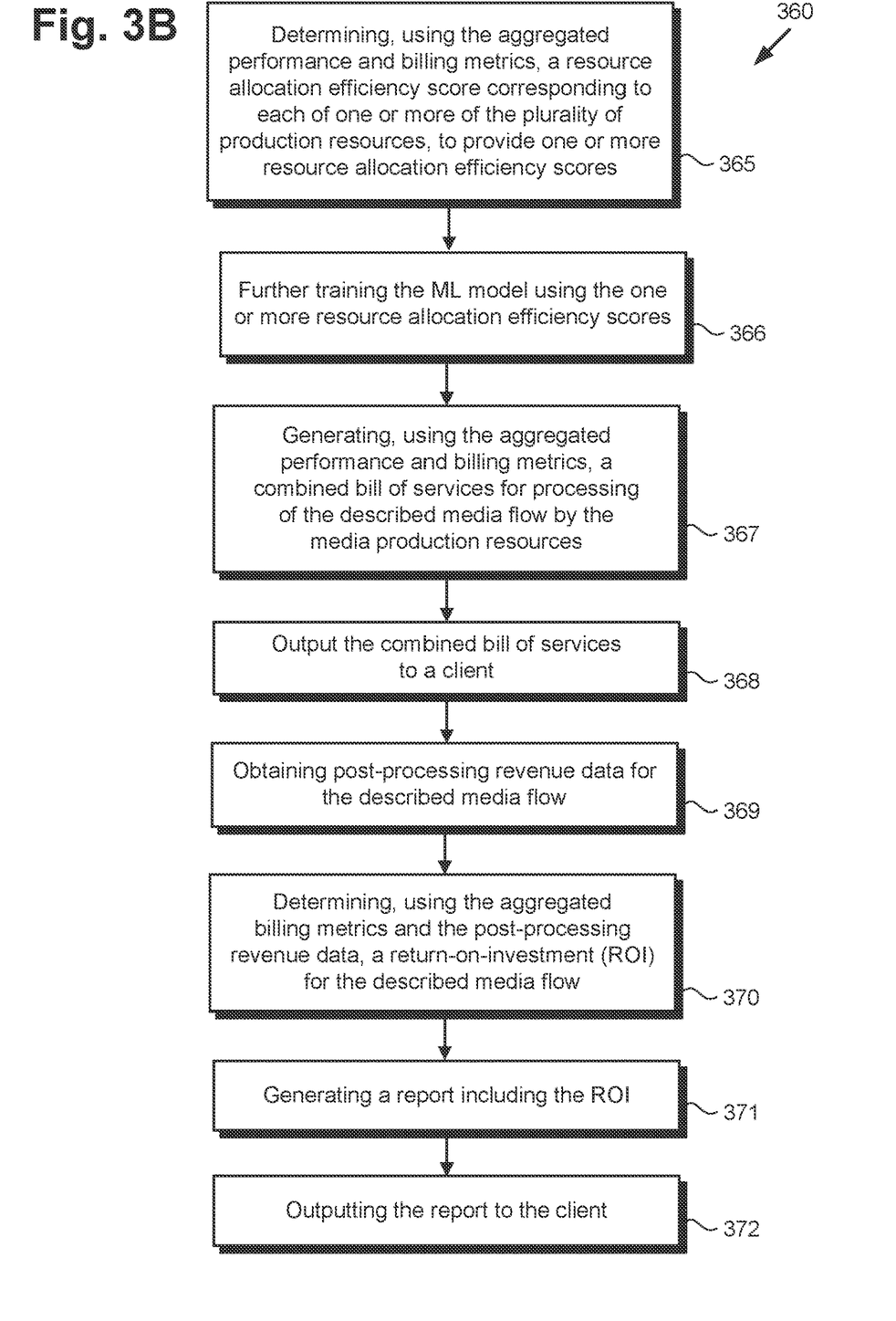
FIG. 3B shows additional actions for extending the method presented in FIG. 3A, according to various implementations.

With respect to the actions described in FIGS. 3A and 3B, it is noted that certain details and features have been left out of flowchart 360 in order not to obscure the discussion of the inventive features in the present application.

Referring to FIG. 3A in combination with FIG. 1, flowchart 360 begins with receiving data 134 describing a media flow requiring processing (action 361). The media flow described by data 134 may include audio content (e.g., streaming audio content), video content (e.g., streaming video content), AV content (e.g., streaming AV content), or graphics, to name a few examples. Moreover, and as noted above, in some implementations the media flow described by data 134 may be a multicast media flow, which, in addition to a real-time media flow, may include associated media files that could be used at runtime, could be re-used at other times, or could be exported. Moreover, where the media flow described by data 134 includes video, that media flow may take the form of a camera feed or a remote feed, for example.

Furthermore, the content included in the media flow described by data 134 may be or include digital representations of persons, fictional characters, locations, objects, and identifiers such as brands and logos, for example, which populate a VR, AR, or MR environment. Moreover, that content may depict virtual worlds that can be experienced by any number of users synchronously and persistently, while providing continuity of data such as personal identity, user history, entitlements, possessions, payments, and the like. It is noted that the content included in the media flow described by data 134 may also be content that is a hybrid of traditional audio-video and fully immersive VR/AR/MR experiences, such as interactive video.

Data 134 may be received in action 361 by software code 106/206, executed by processor 102 of system 100/200. As shown in FIG. 1, in some implementations data 134 may be received from user system 132.

Continuing to refer to FIGS. 1 and 3A in combination, flowchart 360 further includes identifying, using data 134 and ML model 108, media production resources for use in processing the media flow described by data 134 (action 362). As noted above. ML model 108 is trained to optimize allocation of media production resources. For instance. ML model 108 may be trained to allocate media production resources based on parameters described by data 134, including the size of the media flow to be processed, the contents of the media flow, and a time or other constraint or constraints (hereinafter "constraint(s)") for completion of the processing, such as a turnaround time constraint, to name a few examples.

The media production resources identified in action 362 may include cloud-based media production resources 110, local media production resources 120, or cloud-based media production resources 110 and local media production resources 120. In implementations in which system 100/200 provides exclusively cloud-based production management, the media production resources identified in action 362 may be exclusively cloud-based media production resources 110, i.e., may omit any local media production resources 120. Identification of the media production resources for use in processing the media flow described by data 134, in action 362, may be performed by software code 106/206, executed by processor 102 of system 100/200, and using ML model 108.

Continuing to refer to FIGS. 1 and 3A in combination, flowchart 360 further includes obtaining the media production resources identified in action 362 (action 363). As noted above, the media production resources identified in action 362 may include cloud-based media production resources 110, local media production resources 120, or cloud-based media production resources 110 and local media production resources 120. Thus, those media production resources may include any or all of cloud/common carrier bandwidth 111, flow management 112, computing and storage resources 113, and license management 114 for licensing of media production applications 116. In addition, in hybrid cloud production management implementations, those media production resources may further include any or all of flow management 122, license management 124 for licensing of media production applications 126, and local hardware computing and storage resources.

That is to say, in various implementations, the media processing resources obtained in action 363 may include computing resources, data storage resources, licenses such as software licenses, copyright licenses, or software and copyright licenses, for example, media flow management, and media flow bandwidth. Action 363 may be performed by software code 106/206, executed by processor 102 of system 100/200.

Flowchart 360 further includes aggregating, from each of the media production resources obtained in action 363, performance and billing metrics of that media production resource resulting from processing of the described media flow by the obtained media production resources (action 364). Referring to FIG. 2, the performance and billing metrics aggregated in action 364 may be obtained from cloud/common carrier bandwidth provider(s) 241, flow management 242, computing and storage resources 243, and license management 244, via respective API(s) 252, 254, 256, and 258.

As noted above by reference to FIG. 2, the performance and billing metrics aggregated from cloud/common carrier bandwidth provider(s) 241, flow management 242, computing and storage resources 243, and license management 244, may identify the amounts of resources and services provided by cloud/common carrier bandwidth provider(s) 241, flow management 242, computing and storage resources 243, and license management 244, the time duration of use of those resources and services, and the costs of those resources and services. The aggregation of performance and billing metrics in action 364 may be performed by software code 106/206, executed by processor 102 of system 100/200.

In some implementations, the method outlined by flowchart 360 may conclude with action 364 described above. However, in other implementations, that method may be extended to include one or more of the actions described in FIG. 3B. Referring to FIG. 3B in combination with FIGS. 1 and 2, in some implementations, flowchart 360 may continue with determining, using the aggregated performance and billing metrics, a resource allocation efficiency score corresponding to each of one or more of the media production resources identified in action 362, to provide one or more resource allocation efficiency scores (action 365). A resource allocation efficiency score may be a numerical score, such as a percentage score for example, corresponding to how optimal a particular media production resource was for processing of a particular media flow, in view of the constraint(s) imposed on the processing by a client, such as system user 130. By way of example, a resource allocation efficiency score may be a percentage score ranging from zero percent (0%) to one hundred percent (100%), with one 100% indicating that the identified media production resource was optimal for processing of the media flow given the constraint(s).

By way of further example, a resource allocation efficiency score for media production resources in the form of bandwidth provided by cloud/common carrier bandwidth provider(s) 241 may be highest (approximately 100%) if the least amount of bandwidth necessary to enable processing of the media flow, within the constraint(s) imposed on that processing by a client, such as system user 130, and having the lowest cost, were identified in action 362. That resource allocation efficiency score may be lower if too much or too little bandwidth was identified in action 362, or if the cost of the bandwidth is determined to be too high for the client imposed constraint(s), such as media flow processing turnaround time, and may be substantially lower if both bandwidth amount and cost were suboptimal.

Analogous parameters may be used to determine respective resource allocation efficiency scores for media production resources provided by flow management 242, computing and storage resources 243, and license management 244. Action 365, when included in the method outlined by flowchart 360, may be performed by software code 106/206, executed by processor 102 of system 100/200.

In implementations in which the method outlined by flowchart 360 includes action 365, flowchart 360 also include further training, using the one or more resource allocation efficiency scores determined in action 365, ML model 108 (action 366). In instances in which a resource allocation efficiency score for a particular media production resource meets or exceeds a predetermined threshold, such as 90% for the percentage based score described above for example, further training of ML model 108 for allocation of that particular media production resource may be omitted. However, for lower resource allocation efficiency scores associated with other media production resources, it may be advantageous or desirable to further train ML model 108 to allocate those other resources, in order to achieve ongoing improvement in the predictive performance of ML model 108. The further training of ML model 108 in action 366 may be performed by software code 106/206, executed by processor 102 of system 100/200.

In some implementations, the method outlined by flowchart 360 may continue with generating, using the performance and billing metrics aggregated in action 364, combined bill of services 136/236 for processing of the described media flow by the media production resources obtained in action 363 (action 367). Combined bill of services 136/236 may be an itemized accounting of media production resources utilized to process the media flow described by data 134, including usage of each media production resource and the cost of that usage. As noted above, the media production resources utilized in processing of the described media flow by the media production resources obtained in action 363 may be provided by different providers, such as cloud/common carrier bandwidth provider(s) 241, flow management 242, computing and storage resources 243, and license management 244. Combined bill of services 136/236 may be generated in action 367 by software code 106/206, executed by processor 102 of system 100/200.

It is noted that although flowchart 360 lists action 367 as following action 366, that representation is merely exemplary. In other implementations in which flowchart 360 includes action 367, action 367 may precede action 366, may precede action 365, or may be performed in parallel with, i.e., contemporaneously with, either of actions 365 or 366.

In implementations in which the method outlined by flowchart 360 includes action 367, flowchart 360 further includes outputting combined bill of services 136/236 to a client, such as system user 130 (action 368). As shown in FIG. 1, in some implementations action 368 may include transmitting combined bill of services 136/236 to user system 132. Action 368, when included in the method outlined by flowchart 360, may be performed by software code 106/206, executed by processor 102 of system 100/200.

It is noted that although flowchart 360 lists actions 367 and 368 as following action 366, that representation is merely exemplary. In other implementations in which flowchart 360 includes actions 367 and 368, one or both of action 367 and 368 may precede action 366, may precede action 365, or may be performed in parallel with, i.e., contemporaneously with, either of actions 365 or 366.

In some implementations, flowchart 360 further includes obtaining post-processing revenue data for the media flow described by data 134 (action 369). By way of example, where the media flow described by data 134 includes AV content in the form of a movie or other commercially distributed content, such post processing revenue data may identify the earnings of that commercially distributed content over a predetermined period of time, such as week, month, or year or years after its release. That post-processing revenue data may be obtained from system user 130, or from a third party source of revenue data. Action 369, when included in the method outlined by flowchart 360, may be performed by software code 106/206, executed by processor 102 of system 100/200.

In implementations in which flowchart 360 includes action 369, flowchart 360 further includes determining, using the billing metrics aggregated in action 364 and the post-processing revenue data obtained in action 369, a return-on-investment (ROI) for the media flow described by data 134 (action 370). Determining the ROI for the media flow described by data 134 may be performed in action 370, when action 370 is included in the method outlined by flowchart 360, by software code 106/206, executed by processor 102 of system 100/200.

In implementations in which flowchart 360 includes actions 369 and 370, flowchart 360 further includes generating report 138 including the ROI determined in action 370 (action 371). Action 371, when included in the method outlined by flowchart 360, may be performed by software code 106/206, executed by processor 102 of system 100/200.

In implementations in which flowchart 360 includes actions 369, 370, and 371, flowchart 360 further includes outputting report 138 including the ROI determined in action 370 to a client, such as system user 130 (action 372). As shown in FIG. 1, in some implementations action 372 may include transmitting report 138 to user system 132. Action 372, when included in the method outlined by flowchart 360, may be performed by software code 106/206, executed by processor 102 of system 100/200.

With respect to the method outlined by flowchart 360, it is noted that, in various to implementations, actions 361, 362, 363, 364 (hereinafter ("actions 361-364"), actions 361-364, 365, and 366 (hereinafter "actions 361-366"), or actions 361-364, 367, and 368, or actions 361-364, 369, 370, 371, and 372, or actions 361-366, 367, and 368, or actions 361-366, 369, 370, 371, and 372, or actions 361-366, 367, 368, 369, 370, 371, and 372, may be performed in an automated process from which human participation may be omitted.

Thus, the present application discloses systems and methods for providing cloud and hybrid-cloud production management of media flows within a cloud environment, as well as into and out of the cloud environment. The cloud and hybrid-cloud production management solution disclosed in the present application advances the state-of-the-art by creating a metering environment that provisions and tracks substantially all of the resources used in media production. The present cloud and hybrid-cloud production management solution includes software code that, when executed by a processor, accesses all production resources, such as licensing applications, flow management applications, bandwidth utilization applications, and cloud-based computing and storage resources via respective APIs that interpret and track those metrics. The novel and inventive systems and methods disclosed in the present application further advance the state-of-the-art by introducing an AI inspired automated ML model-based approach to allocating media production resources.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a processor; and
   a memory storing a software code and a machine learning (ML) model trained to allocate a plurality of media production resources;
   the processor configured to execute the software code to:
   receive data describing a multicast media flow including audio-video content and originating from one or more senders to be provided to a group of receivers, the data including a size of the multicast media flow, a type of content of the multicast media flow, and a time constraint;
   identify, using the data and the ML model, the plurality of media production resources for use in processing the audio-video content;
   obtain the plurality of media production resources for processing the audio-video content;
   process the audio-video content by the plurality of media production resources;
   after processing, provide the processed audio-video content from the one or more senders to the group of receivers; and
   aggregate, from each of the plurality of media production resources, performance and billing metrics of a respective one of the plurality of media production resources resulting from processing of the audio-video content by the plurality of media production resources.

2. The system of claim 1, wherein the plurality of media production resources comprise cloud-based media production resources.

3. The system of claim 1, wherein the plurality of media production resources consist of cloud-based media production resources.

4. The system of claim 1, wherein the plurality of media production resources include computing resources, data storage resources, licenses, media flow management, and media flow bandwidth.

5. The system of claim 1, wherein the processor is further configured to execute the software code to:
   determine, using the aggregated performance and billing metrics, a resource allocation efficiency score corresponding to each of one or more of the plurality of media production resources to provide one or more resource allocation efficiency scores; and
   further train, using the one or more resource allocation efficiency scores, the ML model trained to allocate the plurality of media production resources.

6. The system of claim 1, wherein the processor is further configured to execute the software code to:
   obtain a post-processing revenue data for the described media flow; and
   determine, using the aggregated billing metrics and the post-processing revenue data, a return-on-investment (ROI) for the described media flow.

7. The system of claim 6, wherein the processor is further configured to execute the software code to:
   generate a report including the ROI; and
   output the report to a client.

8. A method for use by a system including a processor and a memory storing a software code and a machine learning (ML) model trained to allocate a plurality of media production resources, the method comprising:
   receiving, by the software code executed by the processor, data describing a multicast media flow including audio-video content and originating from one or more senders to be provided to a group of receivers, the data including a size of the multicast media flow, a type of content of the multicast media flow, and a time constraint;
   identifying, by the software code executed by the processor and using the data and the ML model, the plurality of media production resources for use in processing the audio-video content;
   obtaining, by the software code executed by the processor, the plurality of media production resources for processing the audio-video content;
   processing, by the software code executed by the processor, the audio-video content by the plurality of media production resources;
   after processing, providing, by the software code executed by the processor, the processed audio-video content from the one or more senders to the group of receivers; and
   aggregating, from each of the plurality of media production resources, by the software code executed by the processor, performance and billing metrics of a respective one of the plurality of media production resources resulting from processing of the audio-video content by the plurality of media production resources.

9. The method of claim 8, wherein the plurality of media production resources comprise cloud-based media production resources.

10. The method of claim 8, wherein the plurality of media production resources consist of cloud-based media production resources.

11. The method of claim 8, wherein the plurality of media production resources include computing resources, data storage resources, licenses, media flow management, and media flow bandwidth.

12. The method of claim 8, further comprising:
determining, by the software code executed by the processor and using the aggregated performance and billing metrics, a resource allocation efficiency score corresponding to each of one or more of the plurality of media production resources to provide one or more resource allocation efficiency scores; and
further training, by the software code executed by the processor an using the one or more resource allocation efficiency scores, the ML model trained to allocate the plurality of media production resources.

13. The method of claim 8, further comprising:
obtaining, by the software code executed by the processor, a post-processing revenue data for the described media flow; and
determining, by the software code executed by the processor and using the aggregated billing metrics and the post-processing revenue data, a return-on-investment (ROI) for the described media flow.

14. The method of claim 13, further comprising:
generating, by the software code executed by the processor, a report including the ROI; and
outputting, by the software code executed by the processor, the report to a client.

15. A system comprising:
a processor; and
a memory storing a software code and a machine learning (ML) model trained to allocate a plurality of media production resources;
the processor configured to execute the software code to:
receive data describing a media flow requiring processing, the data including a type of content of the media flow;
identify, using the data and the ML model, the plurality of media production resources for use in processing the described media flow;
obtain the plurality of media production resources;
aggregate, from each of the plurality of media production resources, performance and billing metrics of a respective one of the plurality of media production resources resulting from processing of the described media flow by the plurality of media production resources;
determine, using the aggregated performance and billing metrics, a resource allocation efficiency score corresponding to each of one or more of the plurality of media production resources to provide one or more resource allocation efficiency scores; and
further train, using the one or more resource allocation efficiency scores, the ML model trained to allocate the plurality of media production resources.

16. The system of claim 15, wherein the processor is further configured to execute the software code to:
obtain a post-processing revenue data for the described media flow; and
determine, using the aggregated billing metrics and the post-processing revenue data, a return-on-investment (ROI) for the described media flow.

17. The system of claim 16, wherein the processor is further configured to execute the software code to:
generate a report including the ROI; and
output the report to a client.

18. The system of claim 15, wherein the described media flow comprises a multicast media flow.

19. The system of claim 15, wherein the described media flow comprises at least one of graphics, streaming audio content, streaming video content, or streaming audio-video content.

20. The system of claim 15, wherein the data includes a size of the media flow and a time constraint.

* * * * *